US007844752B2

(12) United States Patent
Mirabeau et al.

(10) Patent No.: US 7,844,752 B2
(45) Date of Patent: Nov. 30, 2010

(54) METHOD, APPARATUS AND PROGRAM STORAGE DEVICE FOR ENABLING MULTIPLE ASYNCHRONOUS DIRECT MEMORY ACCESS TASK EXECUTIONS

(75) Inventors: Lucien Mirabeau, Tucson, AZ (US); Tiep Quoc Pham, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1361 days.

(21) Appl. No.: 11/289,908

(22) Filed: Nov. 30, 2005

(65) Prior Publication Data

US 2007/0162637 A1    Jul. 12, 2007

(51) Int. Cl.
*G06F 13/28* (2006.01)
*G06F 15/167* (2006.01)

(52) U.S. Cl. .............................. 710/22; 710/23; 710/24; 709/212

(58) Field of Classification Search .................... 710/22, 710/23, 24; 709/212
See application file for complete search history.

(56) References Cited

U.S. PATENT DOCUMENTS

| | | | |
|---|---|---|---|
| 4,272,819 A | 6/1981 | Katsumata et al. | |
| 5,870,627 A * | 2/1999 | O'Toole et al. | ............... 710/22 |
| 6,898,646 B1 | 5/2005 | Bonola et al. | |
| 2002/0091826 A1 | 7/2002 | Comeau et al. | |
| 2004/0187135 A1* | 9/2004 | Pronovost et al. | ........... 718/104 |
| 2006/0085569 A1* | 4/2006 | Buckland et al. | .............. 710/22 |
| 2006/0179179 A1* | 8/2006 | Suzuoki | ....................... 710/22 |
| 2007/0115982 A1* | 5/2007 | Pope et al. | .................. 370/392 |

OTHER PUBLICATIONS

Atsushi Hatabu, et al.; QVGA/CIF Resolution MPEG-4 Video Codec Based on a Low-Power and General-Purpose DSP; Journal; Jul. 14, 2005; Springer Science Business; Netherlands.

* cited by examiner

*Primary Examiner*—Niketa I Patel
(74) *Attorney, Agent, or Firm*—Griffiths & Seaton PLLC (57) ABSTRACT

A method, apparatus and program storage device for enabling multiple asynchronous direct memory access task executions. DMA I/O operations and performance are improved by reducing the overhead in DMA chaining events by creating a software DMA queue when a hardware DMA queue overflows and dynamically linking new DMA requests to the software queue until a hardware queue becomes available at which time the software queue is put on the hardware queue. Thus, microcode does not need to manage the hardware queues and keep the DMA engine running continuously because it no longer has to wait for microcode to reset the DMA chain completion indicator.

19 Claims, 6 Drawing Sheets

METHOD, APPARATUS AND PROGRAM STORAGE DEVICE FOR ENABLING MULTIPLE ASYNCHRONOUS DIRECT MEMORY ACCESS TASK EXECUTIONS

BACKGROUND OF THE INVENTION

1. Field of the Invention

This invention relates in general to direct memory access (DMA), and more particularly to a method, apparatus and program storage device for enabling multiple asynchronous direct memory access task executions.

2. Description of Related Art

In digital computer systems, it is common to use direct memory access (DMA) to transfer data between a system memory attached to a main system bus and input/output (I/O) devices. The direction of data transfer can be from the I/O device to memory, or vice versa. A DMA controller is generally used to transfer blocks of data between an I/O device and consecutive locations in the system memory. A DMA engine is a hardware facility to perform data transfer without using the CPU's processing power.

In order to perform a block transfer, the DMA device needs a source, destination address, control flags to indicate for example direction of the transfer etc., and a count of the number of data items, which may be bytes, words, or other units of information that can be transmitted in parallel on the computer system bus. One simple method by which a DMA controller operates involves a host processor writing directly into the DMA controller to request a block transfer. The host processor must continuously monitor the DMA engine to determine when the transfer completes before requesting a new transfer, leading to an inefficient use of processor time.

Sophisticated DMA controllers typically use a linked list of control blocks in a memory to chain a sequence of DMA operations together. The control blocks, each of which conveys data-transfer parameters between a host processor and DMA controller, are data structures created by the host processor and accessed by the DMA controller for effecting a particular DMA operation.

Often, while the DMA controller is performing a data transfer specified by a particular control block, the host processor specifies additional data transfers by creating additional control blocks. When additional control blocks are created, it is desirable to append the new control blocks to the existing linked list of control blocks to allow the DMA controller to process all the control blocks in one uninterrupted sequence of data transfer operations.

The appending of control block(s) to an existing linked list before completion of a corresponding DMA operation is referred to as dynamic chaining of DMA operations. The transfer of high-speed streaming data (such as multimedia data in storage and network technologies) requires frequent dynamic DMA chaining.

In a DMA engine, microcode builds DMA descriptor chains that provide the linked list of control blocks that specify source, destination and length of the data to be transferred. The DMA hardware has N queues and works on one queue at a time. The microcode puts chains on the queues and ensures that a queue is available before submitting the chain to prevent DMA queue overflow error. The hardware sets a completion bit when a chain completes and microcode must reset the bit before hardware can complete the next DMA queue.

Current designs rely on microcode to reset the DMA chain completion indicator in order for hardware to complete the processing of new chains. This indicator can be processed using a poll or interrupt approach. However, both approaches have problems. For example, the use of the interrupt mechanism results in serious performance impact because the CPU has to save and to restore all internal registers and stacks. In the poll method, time is wasted because the DMA chain completion indicator is not there or has been there long before the poll. Reading hardware registers to see the indicator costs more compared to reading DRAM. Therefore, both cases can cause the hardware to temporarily stop DMA operation until the indicator is reset.

It can be seen then that there is a need for a method, apparatus and program storage device for enabling multiple asynchronous direct memory access task executions.

SUMMARY OF THE INVENTION

To overcome the limitations in the prior art described above, and to overcome other limitations that will become apparent upon reading and understanding the present specification, the present invention discloses a method, apparatus and program storage device for enabling multiple asynchronous direct memory access task executions.

The present invention solves the above-described problems by eliminating the use of DMA chain completion indicator. When the transfer of a current DMA chain is completed, DMA engine will continue to process the next DMA queue slot and no longer have to wait for microcode to reset this indicator. Instead, the microcode will use the DMA queue overflow in normal operation so it will no longer be an error indicator.

A direct memory access controller in accordance with an embodiment of the present invention includes memory for providing a hardware DMA queue for processing DMA chains and a processor, coupled to the memory, the processor being configured to control the processing of DMA chains in the hardware DMA queue until a hardware DMA queue overflow condition is detected, to set a flag to indicate the occurrence of the hardware DMA queue overflow and to move DMA chains to a DMA software queue until a slot in the hardware DMA queue becomes available.

In another embodiment of the present invention, a program storage device includes program instructions executable by a processing device to perform operations for enabling multiple asynchronous direct memory access task executions. An embodiment of the present invention also includes a method for enabling multiple asynchronous direct memory access task executions.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method, apparatus and program storage device for enabling multiple asynchronous direct memory access task executions. An embodiment of the present invention improves DMA I/O operations and performance by reducing the overhead in DMA chaining events by creating a software DMA queue when a hardware DMA queue overflows. Any new DMA request is dynamically linked to the software queue until a hardware queue becomes available at which time the software queue is put on the free hardware queue. The advantages of this approach is to improve performance by eliminating the need for microcode to manage the hardware queues and keep the DMA engine running continuously since it no longer has to wait for microcode to reset the DMA chain completion indicator.

Figure 1:
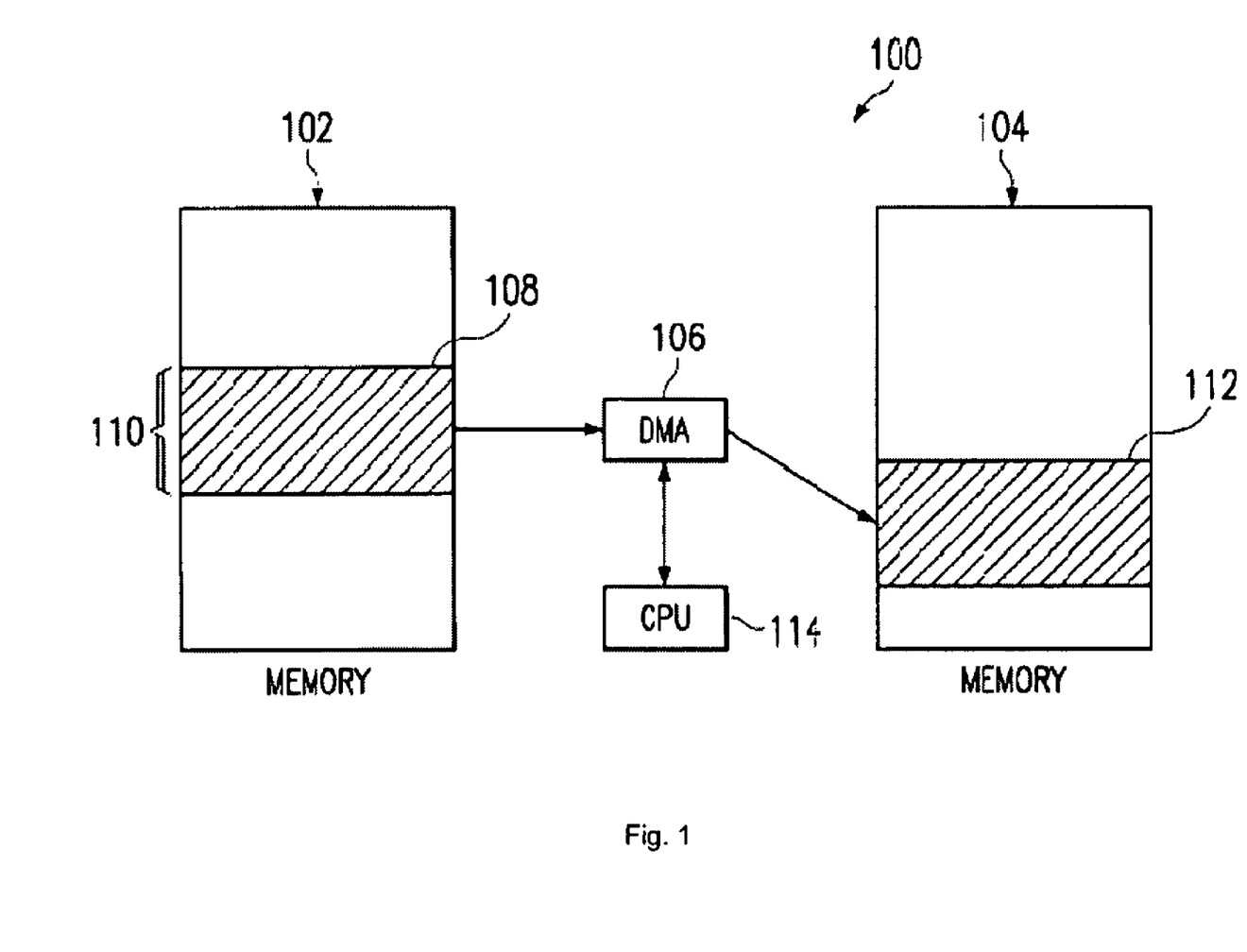
FIG. 1 illustrates a block diagram of a computer system according to an embodiment of the present invention.

FIG. 1 is a block diagram of a computer system 100 having a direct memory access (DMA) controller according to an embodiment of the present invention. In FIG. 1, a first memory location 102 and a second memory location 104 are provided. For example, memory location 102 may be included within a hard disk or some other type of peripheral device, and memory location 104 may be the main memory of computer system 100. However, those skilled in the art will recognize that the present invention is not meant to be limited to this particular example of a hardware environment. DMA controller 106 is coupled between first memory location 102 and second memory location 104. DMA controller 106 is also coupled to CPU 114.

When a device or an application desires to transfer a block of data from memory location 102 to memory location 104, descriptor information is used by DMA controller 106 to identify the desired transfer. The descriptor information may include the source address 108 (i.e., the base address from where bytes are to be moved), the destination address 112 (i.e., the address to where the bytes should be moved), and the length 110 of the block of data to be moved. Based on the received descriptor information, DMA controller 106 performs the identified data transfer operation from memory location 102 to memory location 104.

This data transfer example is a "simple DMA transfer," in that the data transfer that is identifiable by a single descriptor (e.g., a single source, destination, and length). However, more complex DMA transfers are possible and may be referred to as a "chaining DMA." Such a chaining DMA is capable of performing a data transfer of a block of data that is not identifiable by a single descriptor. Further, while CPU 114 may initiate the transfer of data, the transfer itself is performed by the DMA controller 106.

Figure 2:
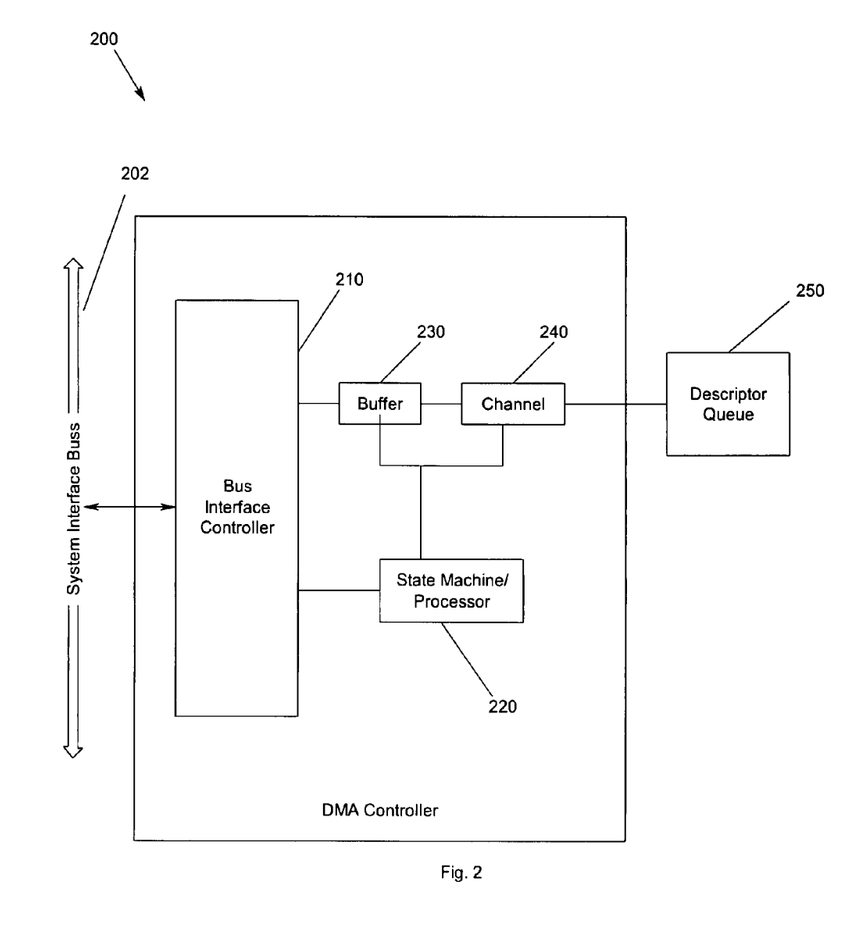
FIG. 2 is a block diagram of a DMA controller according to an embodiment of the present invention.

FIG. 2 is a block diagram of a DMA controller 200 according to an embodiment of the present invention. In FIG. 2, the DMA controller 200 is coupled to the system interface bus 202 by a bus interface controller 210. A state machine or processor 220 is provided to provide pointer and buffer control. A buffer 230 may be coupled to the bus interface controller 210 to receive data. The DMA controller 200 accesses a descriptor queue 250 via channel 240. The processor 220 provides the control of the descriptor queue 250. From the descriptor queue 250, the DMA controller 200 uses a starting address and a maximum buffer size to place receive data into a second memory (not shown) via the system interface bus 202. The data buffer 230 is used to move the received data to the bus interface controller 210. Those skilled in the art will recognize that the present invention is not meant to be limited to the structure shown in FIG. 2. Rather, the DMA controller 200 shown in FIG. 2 is presented as merely an example and a DMA controller 200 may be implemented in accordance with embodiments of the present invention, e.g., the DMA controller 200 may be configured to include multiple channels, buffers, control units, etc.

Figure 3:
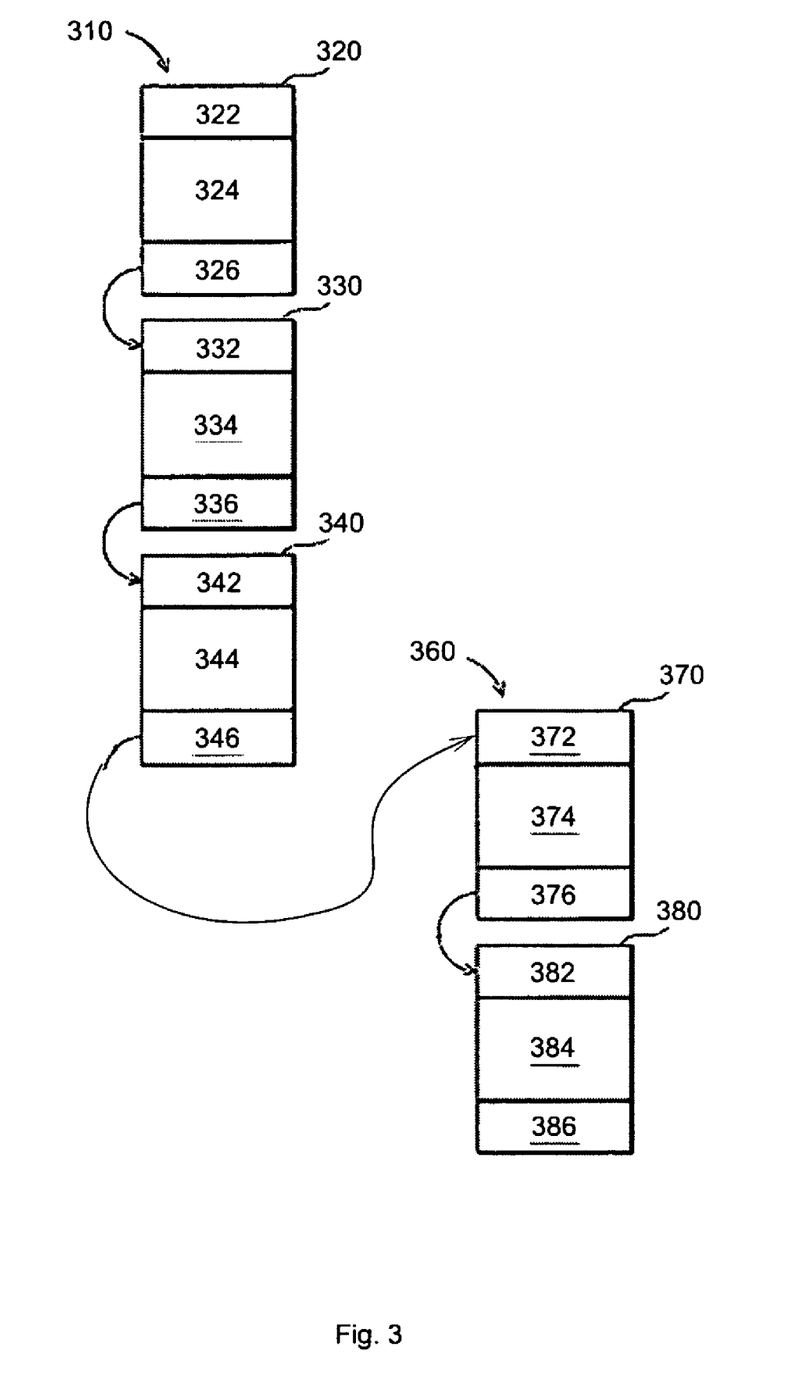
FIG. 3 illustrates dynamic linking of descriptors in a software queue according to an embodiment of the present invention.

FIG. 3 illustrates dynamic linking of descriptors in a software queue 310 according to an embodiment of the present invention. In FIG. 3, three descriptors are identified by reference numerals 320, 330, 340. The descriptors 320, 330, 340 are configured to include EOC entries 322, 332, 342, data-transfer parameters 324, 334, 344 and link pointers 326, 336, 346, respectively. Each of the EOC entries 322, 332, 342 may be set to indicate whether there are other descriptors in the chain 310.

Often, while the DMA controller is performing a data transfer specified by a control block, the host processor specifies additional data transfers by creating additional control blocks (descriptors). However, when the host processor creates an additional descriptor chain, it is desirable to append the new descriptor chain to the previous descriptor chain so as to allow the DMA controller to process all the descriptors in one uninterrupted sequence of data transfers. FIG. 3 shows additional descriptors 370, 380 that have been created before completion of a current DMA operation. As before descriptors 370, 380 also include EOC entries 372, 382, data-transfer parameters 374, 384 and link pointers 37, 38, respectively. Thus, link pointer 346 may be lined to EOC entry 372. Link pointer 376 is coupled to EOC entry 382. Thus, according to an embodiment of the present invention, the additional descriptors 370, 380 are moved to the software queue and chained to the existing descriptors 320, 330, 340 and a chain from EOC entry 322 to link pointer 386 is formed. When a DMA hardware queue slot becomes available, the chained list of descriptors 320, 330, 340, 370, 380 is moved from the software queue to the available hardware queue.

Figure 4:
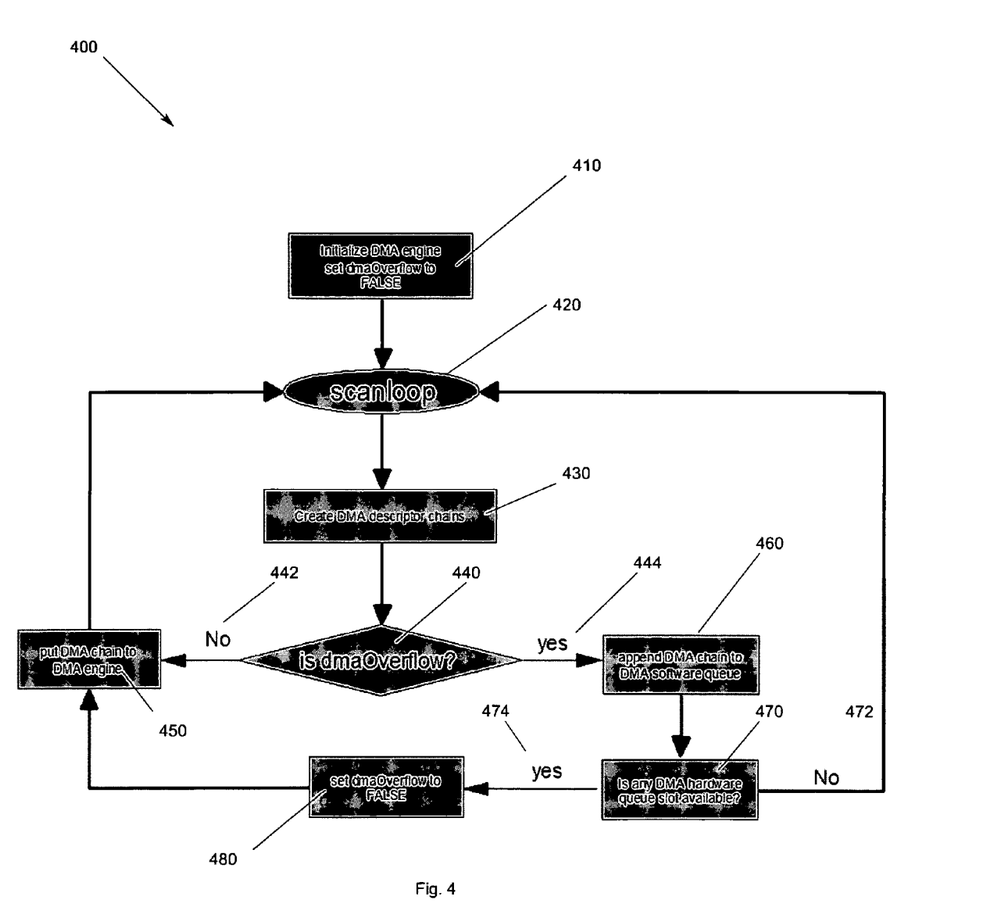
FIG. 4 is a flow chart for a method of enabling multiple asynchronous direct memory access task executions according to an embodiment of the present invention.

FIG. 4 is a flow chart 400 for a method of enabling multiple asynchronous direct memory access task executions according to an embodiment of the present invention. In FIG. 4, microcode first initializes the DMA engine and sets a microcode flag (dmaOverflow) to indicate there is no hardware DMA queue overflow condition 410. Applications are invoked in the scanloop 420. If the applications need to initiate data transfer, they will build new DMA chain 430. A determination is made whether a hardware DMA queue overflow condition occurs 440. If not 442, the microcode will continue to queue the new DMA chains on the hardware queues 450. If a hardware DMA queue overflow condition occurs 444, the microcode will set the dmaOverflow flag and the DMA chain is appended to the DMA software queue 460.

A determination is made whether a DMA hardware queue slot is available 470. If not 472, the process returns to the scanloop 420. If a DMA hardware queue slot is available 474, the new request for DMA transfer queued on a software queue is processed by the available hardware queue and the dmaOverflow flag will be reset 480. Then the microcode will continue to queue the new DMA chains on the hardware queues 450.

Figure 5:
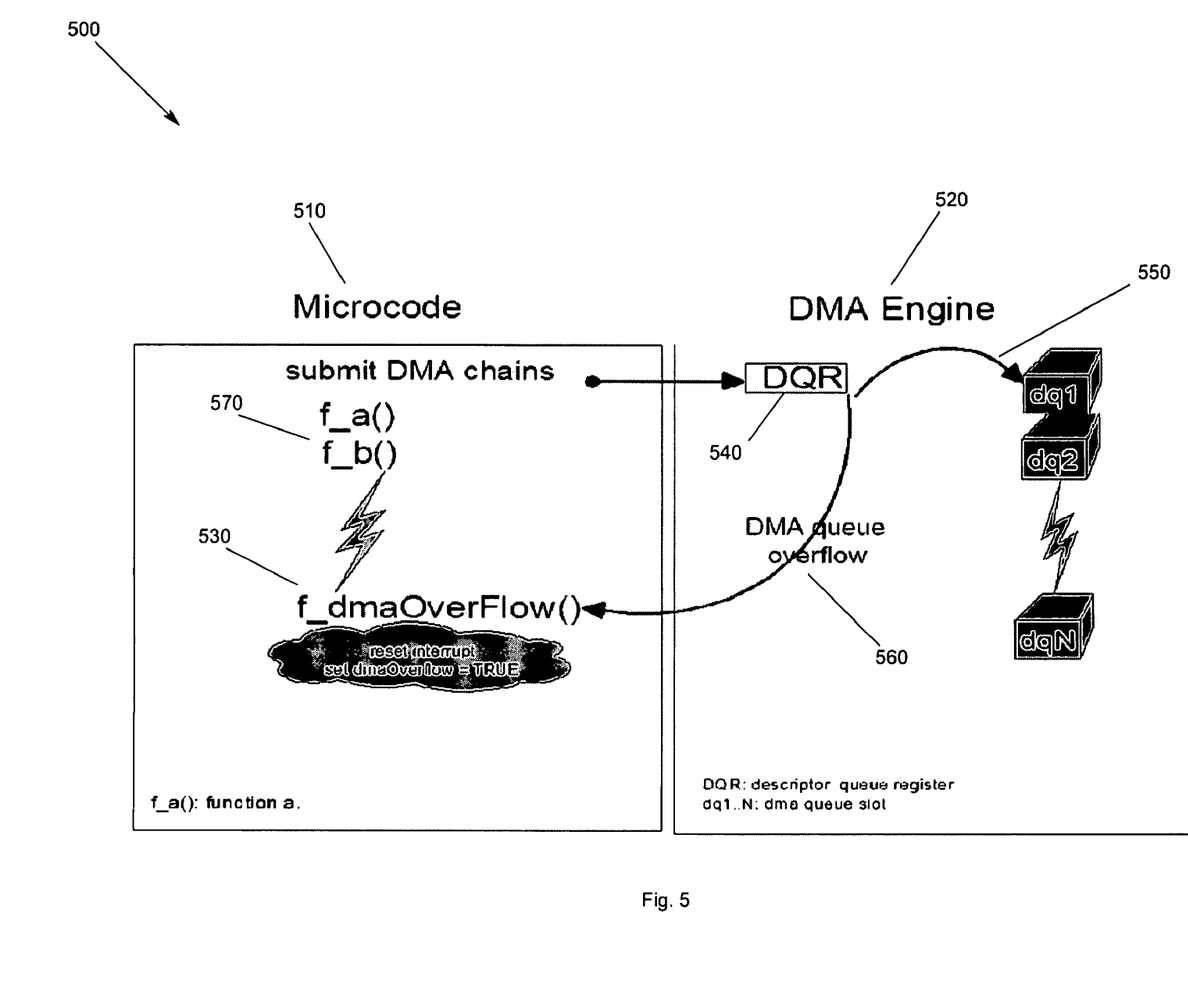
FIG. 5 is a system diagram illustrating the execution of multiple asynchronous direct memory access tasks according to an embodiment of the present invention.

FIG. 5 is a system diagram 500 illustrating the execution of multiple asynchronous direct memory access tasks according to an embodiment of the present invention. In FIG. 5, microcode 510 and DMA engine 520 are shown. The microcode 510 initializes the DMA engine 520 and sets a microcode flag (dmaOverflow) 530. The microcode 510 submits DMA chains to a descriptor queue register (DQR) 540. New DMA chains are built 550. If a hardware DMA queue overflow condition occurs, the DQR 540 of the DMA engine 520 indicates the DMA queue overflow 560. The microcode 510 set the dmaOverflow flag 530 and the DMA chain is appended to the DMA software queue 570. When a DMA hardware queue slot in the DQR 540 becomes available, the microcode moves the DMA transfer queued on a software queue 570 to the queue available in the DQR 540 and resets the dmaOverflow flag 530. The microcode 510 will continue to queue the new DMA chains on the DQR 540.

Figure 6:
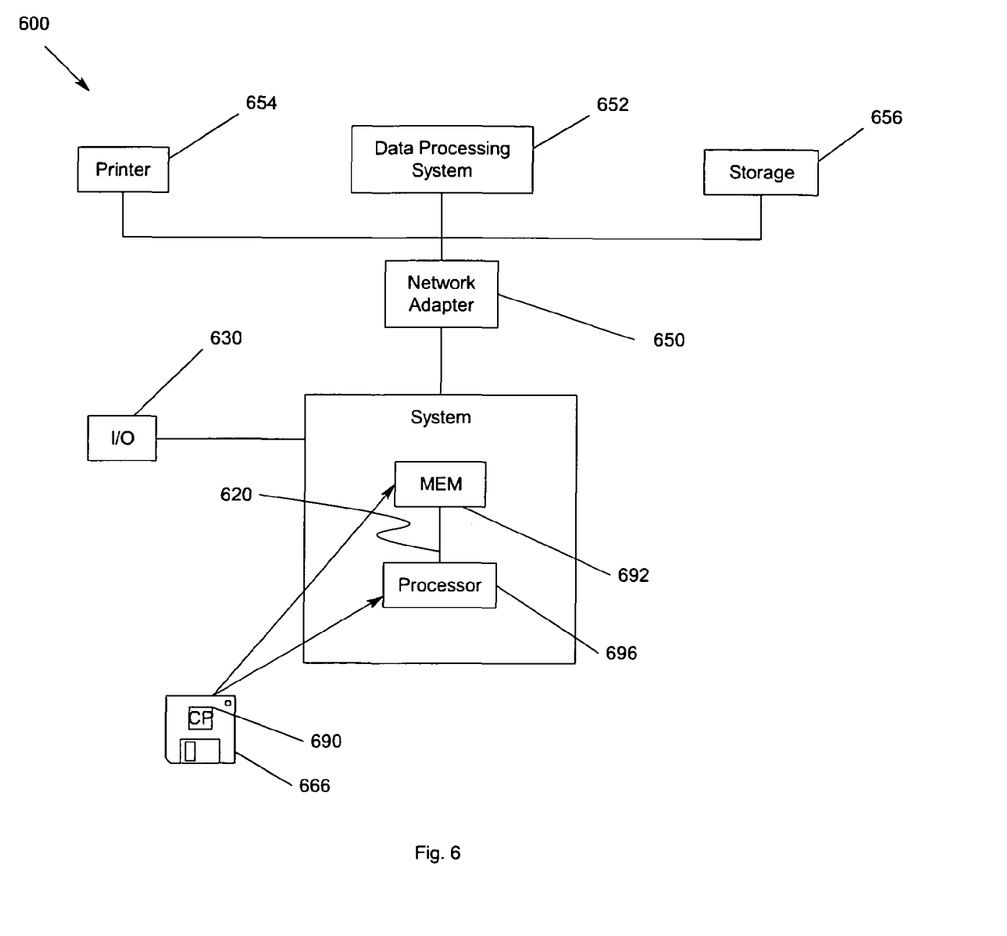
FIG. 6 illustrates a system according to an embodiment of the present invention.

FIG. 6 illustrates a system 600 according to an embodiment of the present invention. Embodiments of the present invention may take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, embodiments of the present invention may take the form of a computer program product 690 accessible from a computer-usable or computer-readable medium 668 providing program code for use by or in connection with a computer or any instruction execution system.

For the purposes of this description, a computer-usable transmission or computer readable storage medium 668 can be any apparatus that can contain, store, communicate, propagate, or transport the program for use by or in connection with the instruction execution system, apparatus, or device. The medium 668 may be an electronic, magnetic, optical, electromagnetic, infrared, or semiconductor system (or apparatus or device) or a propagation medium. Examples of a computer-readable storage medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A system suitable for storing and/or executing program code will include at least one processor 696 coupled directly or indirectly to memory elements 692 through a system bus 620. The memory elements 692 can include local memory employed during actual execution of the program code, bulk storage, and cache memories which provide temporary storage of at least some program code in order to reduce the number of times code must be retrieved from bulk storage during execution.

Input/output or I/O devices 640 (including but not limited to keyboards, displays, pointing devices, etc.) can be coupled to the system either directly to the system or through intervening I/O controllers.

Network adapters 650 may also be coupled to the system to enable the system to become coupled to other data processing systems 652, remote printers 654 or storage devices 656 through intervening private or public networks 660. Modems, cable modem and Ethernet cards are just a few of the currently available types of network adapters.

Accordingly, the computer program 690 comprise instructions which, when read and executed by the system 600 of FIG. 6, causes the system 600 to perform the steps necessary to execute the steps or elements of the present invention The foregoing description of the embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A direct memory access controller, comprising:
   memory for providing a hardware DMA queue for processing DMA chains; and
   a processor, coupled to the memory, the processor being configured to control the processing of DMA chains in the hardware DMA queue until a hardware DMA queue overflow condition is detected, to set a flag to indicate the occurrence of the hardware DMA queue overflow and to move DMA chains to a DMA software queue until a slot in the hardware DMA queue becomes available.

2. The direct memory access controller of claim 1, wherein the processor is further configured to initialize a DMA engine and set the flag to indicate absence of a hardware DMA queue overflow condition prior to processing DMA chains.

3. The direct memory access controller of claim 2, wherein the processor is further configured to move the DMA chains queued on the DMA software queue to the available slot in the hardware DMA queue and reset the flag to indicate absence of a hardware DMA queue overflow condition.

4. The direct memory access controller of claim 1, wherein the processor is further configured to invoke an application in a scanloop, to build DMA chains when the application needs to initiate data transfer and to submit DMA chains to a hardware DMA queue for execution.

5. The direct memory access controller of claim 1, wherein the processor is further configured to move the DMA chains queued on the DMA software queue to the available slot in the hardware DMA queue and reset the flag to indicate absence of a hardware DMA queue overflow condition.

6. The direct memory access controller of claim 5, wherein the processor is further configured to continue to submit DMA chains to the hardware DMA queue.

7. The direct memory access controller of claim 5, wherein the memory further comprises microcode, the microcode providing instructions operable by the processor to perform operations for controlling the software DMA queue when the hardware DMA queue overflows to allow DMA chains to be continually processed without a queue completion indicator.

8. A computer program product for enabling multiple asynchronous direct memory access tasks, the computer program product comprising a computer-readable storage medium having computer-readable program code portions stored therein, the computer-readable program code portions comprising:
   a first executable portion for processing DMA chains in a hardware DMA queue until a hardware DMA queue overflow condition occurs;
   a second executable portion for setting a flag to indicate the occurrence of a hardware DMA queue overflow; and a third executable portion for moving DMA chains to a DMA software queue until a slot in the hardware DMA queue becomes available.

9. The computer program product of claim 8, further comprising:
   a fourth executable portion for initializing a DMA engine, and
   a fifth executable portion for setting the flag to indicate absence of a hardware DMA queue overflow condition prior to processing DMA chains.

10. The computer program product of claim 9, further comprising:
    a sixth executable portion for moving the DMA chains queued on the DMA software queue to the available slot in the hardware DMA queue, and
    a seventh executable portion for resetting the flag to indicate absence of a hardware DMA queue overflow condition.

11. The computer program product of claim 8, further comprising a fourth executable portion for, pursuant to processing DMA chains in a hardware DMA queue, invoking an application in a scanloop, building DMA chains when the application needs to initiate data transfer, and submitting DMA chains to a hardware DMA queue for execution.

12. The computer program product of claim 8, further comprising:
    a fourth executable portion for moving the DMA chains queued on the DMA software queue to the available slot in the hardware DMA queue, and
    a fifth executable portion for resetting the flag to indicate absence of a hardware DMA queue overflow condition.

13. The computer program product of claim 12, further comprising a sixth executable portion for continuing to submit DMA chains to the hardware DMA queue.

14. A method for enabling multiple asynchronous direct memory access task executions, comprising:
    processing DMA chains in a hardware DMA queue until a hardware DMA queue overflow condition occurs;
    setting a flag to indicate the occurrence of a hardware DMA queue overflow; and
    moving DMA chains to a DMA software queue until a slot in the hardware DMA queue becomes available.

15. The method of claim 14 further comprising:
    initializing a DMA engine; and
    setting the flag to indicate absence of a hardware DMA queue overflow condition prior to processing DMA chains.

16. The method of claim 15 further comprising: moving the DMA chains queued on the DMA software queue to the available slot in the hardware DMA queue; and resetting the flag to indicate absence of a hardware DMA queue overflow condition.

17. The method of claim 14, wherein the processing DMA chains in a hardware DMA queue further comprises: invoking an application in a scanloop, building DMA chains when the application needs to initiate data transfer; and submitting DMA chains to a hardware DMA queue for execution.

18. The method of claim 14 further comprising:
    moving the DMA chains queued on the DMA software queue to the available slot in the hardware DMA queue; and
    resetting the flag to indicate absence of a hardware DMA queue overflow condition.

19. The method of claim 18 further comprising continuing to submit DMA chains to the hardware DMA queue.

* * * * *